(12) United States Patent
Nagler et al.

(10) Patent No.: US 6,536,573 B2
(45) Date of Patent: Mar. 25, 2003

(54) CLUTCH ACTUATION SYSTEM WITH AUXILIARY ACTUATING ASSEMBLY

(75) Inventors: Franz Nagler, Gädheim-Ottendorf (DE); Hans Fliege, Obertheres (DE)

(73) Assignee: Mannesmann Sachs AG, Schweinfurt (DE)

( * ) Notice: Subject to any disclaimer, the term of this patent is extended or adjusted under 35 U.S.C. 154(b) by 4 days.

(21) Appl. No.: 09/833,976

(22) Filed: Apr. 12, 2001

(65) Prior Publication Data

US 2001/0037927 A1 Nov. 8, 2001

(30) Foreign Application Priority Data

Apr. 14, 2000 (DE) ......................... 100 18 679
Jan. 19, 2001 (DE) ......................... 101 02 375

(51) Int. Cl.[7] ............................................. F16D 25/12
(52) U.S. Cl. ................................. 192/85 R; 192/91 R
(58) Field of Search ....................... 192/85 R, 85 CA, 192/85 C, 91 R, 91 A

(56) References Cited

U.S. PATENT DOCUMENTS

| 5,004,086 | A | | 4/1991 | Petzold et al. ............... 192/85 |
| 5,135,091 | A | | 8/1992 | Albers et al. |
| 5,273,143 | A | * | 12/1993 | Voss et al. ................. 192/3.58 |
| 5,513,732 | A | * | 5/1996 | Goates ........................ 192/3.3 |

FOREIGN PATENT DOCUMENTS

| DE | 43 24 063 A1 | * | 1/1995 |
| DE | 197 16 600 | | 12/1997 |
| EP | 0 453 749 A2 | | 10/1991 |
| WO | WO 90/14534 | | 11/1990 |

* cited by examiner

*Primary Examiner*—Richard M. Lorence
(74) *Attorney, Agent, or Firm*—Cohen, Pontani, Lieberman & Pavane

(57) ABSTRACT

An actuation system for a friction clutch installed in the drive train of a motor vehicle between a drive unit and a transmission includes a pressure medium-powered cylinder assembly and a pilot/automatic control valve assembly. An auxiliary actuating assembly includes an auxiliary actuating valve assembly, which can be switched into a pressure medium feed position, wherein the pressure medium-powered cylinder assembly can be connected with the pressure medium source or with a separate auxiliary pressure medium source for emergency actuation of the clutch, and into a pressure medium discharge position, wherein the cylinder assembly can be connected with a pressure compensation port or with a pressure compensation tank.

37 Claims, 6 Drawing Sheets

| VEHICLE STATUS | SUPPLY PRESSURE STATUS | CONTROL MODULE STATUS | STATUS OF COND. DISPLAY | SITUATION FOR |
|---|---|---|---|---|
| PARKED IN GEAR 24V OK | 0 BAR | SENSORS OK | OFF | DRIVER |
| IDLING | <5.5 BAR | NOT OK | BLINKING AT X HZ | CLUTCH POSITION |
| MANEUVERING | >5.5 BAR | ELECTRONICS OK | LIT CONTINUOUSLY | GEAR POSITION |
| ENGAGED DRIVING | | NOT OK | | |
| | | AUTO. CONTROL VALVE OK | | |
| | | NOT OK | | |

DIFFERENTIABLE CRITERIA

FIGURE 4

SIMPLIFIED CRITERIA

| VEHICLE STATUS | SUPPLY PRESSURE STATUS | CONTROL MODULE STATUS | STATUS OF COND. DISPLAY | SITUATION FOR |
|---|---|---|---|---|
| PARKED IN GEAR | < 5.5 BAR | SIGNAL CIRCUIT OK | OFF | DRIVER |
| IDLING MANEUVERING DRIVING | > 5.5 BAR | NOT OK | LIT CONTINUOUSLY | CLUTCH POSITION |
| | | | | GEAR POSITION |

FIGURE 5

ERROR LOGIC

| POSSIBLE ERROR STATES | ENABLE RELAY | | SHUTOFF VALVE | |
|---|---|---|---|---|
| | CONTROL DATA | CONTACT STATUS | CONTROL DATA | VALVE STATUS |
| ELECTRONICS OK STATUS LINE OK | STATUS CURRENT PRESENT | OPEN | STATUS CURRENT PRESENT | OPEN |
| PRESSURE CIRCUIT 4 OK | | RESTING; RELAY HELD | | VALVE SEAT HELD |
| ELECTRONICS NOT OK STATUS LINE NOT OK | NO STATUS CURRENT POSSIBLE | CLOSED | NO STATUS CURRENT POSSIBLE | BLOCKING |
| PRESSURE CIRCUIT 4 OK | | SPRING CLOSES CONTACTS | | SPRING CLOSES VALVE |
| ELECTRONICS NOT OK STATUS LINE NOT OK | NO STATUS CURRENT POSSIBLE | CLOSED | NO STATUS CURRENT POSSIBLE | BLOCKING |
| PRESSURE CIRCUIT 4 NOT OK | | SPRING CLOSES CONTACTS | | SPRING CLOSES VALVE |
| ELECTRONICS OK STATUS LINE OK | STATUS CURRENT SUPPRESSED; CONTROL MODULE DETECTS NO PRESSURE | CLOSED SPRING CLOSES CONTACTS | STATUS CURRENT SUPPRESSED; CONTROL MODULE DETECTS NO PRESSURE | BLOCKING SPRING CLOSES VALVE |
| PRESSURE CIRCUIT 4 NOT OK | | | | |

FIGURE 6

CLUTCH ACTUATION SYSTEM WITH AUXILIARY ACTUATING ASSEMBLY

BACKGROUND OF THE INVENTION

1. Field of the Invention

The invention pertains to an actuation system for a friction clutch installed in the drive train of a motor vehicle, especially a commercial motor vehicle, between a drive unit, especially an internal combustion engine, and a transmission. This actuation system includes a pressure medium-powered cylinder assembly which is used to actuate the friction clutch; a pilot/automatic control valve assembly connected to the source of the pressure medium, by means of which the pressure medium-powered cylinder assembly can be actuated as a function of a control input representing a desired actuation state, possibly the desired position of a disengaging device, and an actual value representing an actual actuation state, possibly the actual position of the disengaging device. An auxiliary actuating assembly is provided for clutch actuation independently of the ability of the valve assembly to function and/or independently of the ability of a pilot/automatic control unit driving the valve assembly to function and/or independently of the instantaneous pressure of the pressure being made available by the pressure medium source.

2. Description of the Related Art

An actuation system of this type is known from, for example, DE 197 16 600 A1, the disclosure of which is incorporated herein by reference.

In the known actuation system, the actual position of a disengaging bearing assembly is detected by a hydraulic measuring cylinder assembly, which cooperates with a pilot/automatic control valve assembly operating according to the principle of the pressure scale. The pressure medium-powered cylinder assembly, which can be designed, for example, as a pneumatic cylinder, is actuated via the pilot/automatic control valve assembly as a function of the actual value detected by hydraulic means and a hydraulic signal, which represents the control input and which is transmitted by a hydraulic master cylinder associated with a clutch pedal assembly. According to a variant, the hydraulic measuring cylinder assembly is designed as a slave cylinder assembly, which acts on the disengaging bearing assembly. The slave cylinder assembly is used for the emergency or auxiliary actuation of the clutch. According to another variant, a hydraulic slave cylinder assembly is provided in addition to the pneumatically powered cylinder assembly to make possible an emergency or auxiliary actuation of the clutch.

An emergency or auxiliary actuation of the friction clutch is desirable for a number of different reasons. For example, after the vehicle in question has been parked for a certain period of time, the compressed air tank of the pressure medium source can become completely empty as a result of leaks in the individual receivers. If the vehicle was parked with a gear engaged, the tension of the drive train would make it impossible to disengage the gear without emergency or auxiliary actuation of the clutch, and the vehicle's engine could therefore not be started to fill the compressed air tank back up again. Auxiliary actuation of the clutch is therefore extremely important in practical terms, both for passenger and commercial vehicles.

An extremely high degree of operational reliability is also required for commercial vehicles for another reason. It is generally known, for example, that various components, such as electronic components, can fail and that in such a situation the vehicle must be taken to the nearest garage still under its own power if possible and possibly in a manner deprived of a certain convenience. We speak in this situation of a so-called "limp-home" function.

In themselves, these requirements are fulfilled by the known solutions according to DE 197 16 600 A1. An auxiliary actuation system designed in this way, however, suffers from several disadvantages. For example, the auxiliary actuation of a clutch of this type requires the driver to exert a great deal of force on the clutch pedal, which the driver can do only with great effort. In addition, the auxiliary actuation system represents a high degree of mechanical and hydraulic complexity. For example, a master cylinder assembly designed for high pressures, an appropriately massive clutch pedal, and a hydraulic slave cylinder assembly designed for high pressures (and possibly a measuring cylinder assembly) are all required. Because the components must be very strong, they must also be correspondingly heavy and bulky. The auxiliary actuation system therefore also occupies a considerable amount of space. In addition, it is disadvantageous on principle to provide a hydraulic slave cylinder assembly inside a clutch cover, because these cylinders can leak, and the escape of the hydraulic oil can cause damage. In contrast to a pneumatically powered cylinder assembly, in which a certain amount of leakage can be readily tolerated, a hydraulic slave cylinder assembly must be leak-tight, or else the leaky hydraulic slave cylinder assembly must be repaired or replaced. Depending on the design of the hydraulic slave cylinder assembly (a ring-type hydraulic slave cylinder, for example), the corresponding repair and maintenance work may require that the drive train be separated, possibly including the removal of the clutch cover from the internal combustion engine. A disengaging system of this type appears to be too complicated for modern, electronically controlled drive trains, nor is it very satisfactory with respect to positioning accuracy.

SUMMARY OF THE INVENTION

Against this background, it is the object of the present invention to provide an actuation system of the general type described above in which the auxiliary actuating assembly is improved with respect to at least some of the aspects discussed above.

To achieve this object, in accordance with a first aspect of the invention, the auxiliary actuating assembly includes an auxiliary actuating valve assembly, which can be switched to a pressure medium feed position and/or to a pressure medium discharge position. By means of this valve assembly, the pressure medium-powered cylinder assembly can be brought into pressure medium flow connection with the pressure medium source or with a separate, auxiliary pressure medium source for the emergency actuation of the clutch (pressure medium feed position of the valve assembly) or into pressure medium flow connection with a pressure compensation port or a pressure compensation tank (pressure medium discharge position of the valve assembly).

According to the invention, the auxiliary actuation by the pressure medium-powered cylinder assembly, preferably a pneumatically powered cylinder assembly, is accomplished by means of an auxiliary actuating valve assembly, which can be switched into a pressure medium feed position, in which the pressure medium-powered cylinder assembly is in pressure medium flow connection with the pressure medium source or with a separate auxiliary pressure medium source for the emergency actuation of the clutch. Alternatively or additionally, the auxiliary actuating valve assembly can be switched to a pressure medium discharge position, in which the pressure medium-powered cylinder assembly is in pressure medium flow connection with a pressure compensation port or a pressure compensation tank for the emergency actuation of the clutch. A central auxiliary actuation function is present as soon as it becomes possible for the clutch to be disengaged by the intermediate action of the auxiliary actuating valve assembly, so that, even though a gear is engaged and the drive train is under tension, the gear can still be disengaged and the drive unit (the engine) can be started for the purpose of, for example, refilling the pneumatic or compressed air tank of the pressure medium source, which in this case is designed as a pneumatic source. Preferably, however, the clutch can be both disengaged and engaged by the intermediate action of the auxiliary actuating valve assembly. Thus it becomes possible not only for an engaged gear to be disengaged and for the drive unit to be started, but also for a gear to be made available for an emergency drive function, so that the vehicle can be driven out of a danger area or even driven to a repair garage (limp-home function). It would be ideal for the intermediate action of the auxiliary actuating valve assembly to make possible several engagements and disengagements or disengagements and engagement of the friction clutch by the appropriate switching of the auxiliary actuating valve assembly back and forth several times between the pressure medium flow position and the pressure medium discharge position. Only in this way is a truly complete limp-home function realized, in which the vehicle can move under its own power over a relatively long distance.

It is proposed that the auxiliary actuating valve assembly be switchable into the pressure medium feed position and/or into the pressure medium discharge position without the intermediate agency of the pilot/automatic control unit and/or independently of an instantaneous value of the actual value and/or independently of an instantaneous value of the control input. The auxiliary actuation of the clutch therefore does not depend on the good working order of the pilot/automatic control unit, on the good working order of a measuring device which detects the actual value, or on the good working order of a master unit which transmits the control input. So that there is no dependence on the good working order of an electronic control unit or the like, it is also preferred that the auxiliary actuating valve assembly be switchable manually by either electrical or mechanical means. It is possible, for example, to provide a simple mechanical or electrical switch, which acts directly on at least one switching valve of the auxiliary actuating valve assembly. It is also possible for the auxiliary actuating valve assembly to be switchable by the intermediate agency of the clutch pedal.

Although it is conceivable that the auxiliary actuating valve assembly could belong at least in part to the pilot/automatic control assembly, it is preferable with respect to redundancy and thus an increase in operational reliability that the auxiliary actuating valve assembly be a valve assembly separate from the pilot/automatic control valve assembly.

In a normal actuating situation, the pilot/automatic control valve assembly can be in pressure medium flow connection with the pressure medium-powered cylinder assembly by way of a switching valve assembly of the auxiliary actuating valve assembly. In an emergency actuation situation, it is preferable for the pressure medium-powered cylinder assembly to be isolated from the pilot/automatic control valve assembly by means of the switching valve assembly in order to prevent the pilot/automatic control valve assembly from interfering with the emergency actuation. If, namely, the pilot/automatic control valve assembly were to assume a pressure medium discharge position, in which, in and of itself, a pressure medium flow connection is established between the pressure medium-powered cylinder assembly and a pressure compensation port or a pressure compensation tank, and if in this situation the pilot/automatic control valve assembly could not be switched back out of this position as a result of a defect, the isolation of the pilot/automatic control valve assembly by the switching valve assembly prevents the pressure medium, which is to be supplied to the pressure medium-powered cylinder assembly for the auxiliary actuation of the clutch, from escaping via the pilot/automatic control valve assembly.

In regard to auxiliary actuation, it is proposed in particular that, in an emergency actuation situation, pressure medium can be supplied from the pressure medium source or auxiliary pressure medium source to the pressure medium-powered cylinder assembly or that pressure medium can be discharged from the pressure medium-powered cylinder via a/the switching valve assembly. For this purpose, it is proposed as an especially preferred elaboration that, in a first switching position of the switching valve assembly, pressure medium can be supplied from the pressure medium source to the pressure medium-powered cylinder assembly and that, in a second switching position of the switching valve assembly, pressure medium can be supplied from the auxiliary pressure medium source to the pressure medium-powered cylinder assembly. According to this proposal, therefore, an auxiliary pressure medium source is provided in addition to the pressure medium source; this auxiliary source then supplies for example, the pressure medium-powered cylinder assembly when the pressure medium source can no longer provide pressure medium at sufficient pressure. For this purpose, it is especially advisable for the auxiliary pressure medium source to comprise an auxiliary pressure medium tank.

It is preferable that it be possible for the auxiliary pressure medium tank to be filled by the pressure medium source. For this purpose it is specifically proposed that, in a normal operating state or a regeneration operating state of the actuation system, pressure medium can be supplied from the pressure medium source to the auxiliary pressure medium tank via a/the switching valve assembly of the auxiliary actuating valve assembly and can be stored in the auxiliary pressure medium tank. To counteract the gradual emptying of the auxiliary pressure medium tank as a result of leakage in the pressure medium system, it is especially advisable to provide the auxiliary pressure medium tank with a switching or shutoff valve assembly, by means of which the tank can be isolated from the rest of the pressure medium system.

A control/diagnosis unit can be provided, which serves to detect and evaluate the pressure of the pressure medium provided by the pressure source and/or the pressure of the pressure medium in at least one pressure medium receiver circuit and/or the pressure of the pressure medium of the auxiliary pressure medium tank and/or to monitor the working order of the pilot/automatic control valve assembly and/or the working order of the pilot/automatic control unit which controls the pilot/automatic control valve assembly. This control/diagnosis unit then serves, as a function of these data, to operate a vehicle information system and/or at least one valve of the actuation system and/or to block or to enable a normal clutch actuation and/or to block or to enable an emergency clutch actuation and/or to initiate the filling of the auxiliary pressure medium tank.

The control/diagnosis unit preferably monitors a position control circuit of the pressure medium-powered cylinder assembly, this circuit comprising the pilot/automatic control valve assembly and, if desired, the pilot/automatic control unit, to determine whether or not an actual position value has been adjusted to a predetermined desired position value in agreement with a predetermined agreement criterion within a predetermined desired actuating time. This control/diagnosis unit then serves to operate, as a function of these data, a vehicle information system and/or at least one valve of the actuation system and/or to block or to enable a normal clutch actuation and/or to block or to enable an emergency clutch actuation. This proposal is based on the insight that there is no need for a detailed error analysis as a basis for switching from a normal clutch actuation mode in an emergency to an auxiliary clutch actuation mode. Whatever the defect, it will always reveal itself at least by the fact that the automatic position control circuit has failed to adjust the actual position value back to the desired position value sufficiently within a desired adjusting time. The agreement criterion can specify that the actual position value should be essentially the same as the desired position value, possibly within a certain allowable tolerance range. In the case of a system which is designed to eliminate the difference between the actual position value and desired position value within approximately 150 ms, for example, it is possible to specify a value of 200 ms for the desired adjusting time.

The blocking of normal clutch actuation can comprise a compulsory switching of a shutoff valve assembly into a blocking condition, in which a first pressure medium subsystem comprising the pilot/automatic control valve assembly is isolated from a second pressure medium subsystem comprising the pressure medium-powered cylinder assembly and the auxiliary actuating valve assembly. The enabling of normal clutch actuation can comprise a switching of a/the shutoff valve assembly to a connecting condition, in which a/the first pressure medium subsystem comprising the pilot/automatic control valve assembly is connected to a/the second pressure medium subsystem comprising the pressure medium-powered cylinder assembly and the auxiliary actuating valve assembly via the shutoff valve assembly.

The enabling of auxiliary clutch actuation can release the auxiliary actuating valve assembly so that it can switch as desired either to the pressure medium feed position or to the pressure medium discharge position. The blocking of auxiliary clutch actuation can comprise a compulsory switching of the auxiliary actuating valve assembly to a neutral position (possibly corresponding to a hold position in auxiliary actuation mode), in which the auxiliary actuating valve assembly allows no pressure medium feed to the pressure medium-powered cylinder assembly and no pressure medium discharge from the pressure medium-powered cylinder assembly.

According to a preferred embodiment, the auxiliary actuating valve assembly and/or the shutoff valve assembly is designed and connected so that normal clutch actuation is blocked and the auxiliary clutch actuation is enabled when at least one predetermined error criterion is fulfilled. What is intended here in particular is that the error criterion pertain to the existence of at least one signal which is transmitted by the control/diagnosis unit and which possibly encodes the normal clutch actuation mode and/or the auxiliary clutch actuation mode. In addition, it will usually be advisable for an error criterion to pertain to the availability of the minimum pressure medium pressure required for normal actuation of the clutch.

It is also proposed that an error criterion pertain to the good working order of the electronic pilot/automatic control circuitry and of the pilot/automatic control valve assembly. The error criterion can also pertain to the adjusting of the actual position value to the predetermined desired position value in agreement with the predetermined agreement criterion within the predetermined desired adjusting time.

In accordance with a second aspect of the invention, it is proposed in conjunction with the previously described actuation system, which is not necessarily equipped with an auxiliary actuating assembly, to provide a shutoff or switching valve assembly associated with the pressure medium tank of the pressure medium source and/or a separate auxiliary pressure medium tank of the auxiliary actuating assembly be provided. By means of this valve assembly a pressure medium subsystem comprising at least one pressure medium receiver can be connected to the tank, and the tank can be isolated at least during relatively long idle periods of the vehicle from the pressure medium subsystem in order to prevent the tank from slowly emptying as a result of leakage in the pressure medium subsystem. When this proposal is implemented, leakage in the pressure medium subsystem, specifically leakage in one or more pressure medium users, no longer plays a role with respect to the service life of the tank. The service life of the tank now depends only on the leak-tightness of the tank itself, on the leak-tightness of any pressure medium connection between the shutoff or switching valve assembly and the tank, and on the leak-tightness of the shutoff or switching valve assembly. Even though, as mentioned, this idea of the invention can be applied to the pressure medium tank of the pressure medium source, the primary intention is that it be applied to the auxiliary tank of the auxiliary actuating assembly separate from the pressure medium source. The shutoff or switching valve assembly will then be assigned to this auxiliary pressure medium tank.

In accordance with a third aspect of the invention, the auxiliary actuating assembly includes an auxiliary pressure medium tank separate from the pressure source, which tank can be brought into pressure medium flow connection with the pressure medium source via an associated valve assembly in order to fill the auxiliary pressure medium tank with pressure medium. This auxiliary tank can be brought via the valve into pressure medium flow connection with the pressure medium-powered cylinder assembly in order to actuate the clutch, preferably to disconnect it. The auxiliary tank can be isolated by means of the valve assembly from the rest of the pressure medium system, including the pressure medium source and the pressure medium-powered cylinder assembly, in order to keep the pressure medium in the auxiliary pressure medium tank available for use in emergency actuation situations. The auxiliary pressure medium tank makes it possible for the clutch to be actuated in auxiliary mode independently of the pressure medium source.

The valve assembly preferably has at least one nonreturn valve, which, as a function of at least one pressure medium pressure being applied to it, enables and blocks the pressure medium flow connection between the pressure medium source and the auxiliary pressure medium tank. It is advantageous for the assembly to be designed so that a valve does not have to be actuated separately to fill the auxiliary pressure medium tank, but rather so that the nonreturn valve always opens automatically to allow the filling of the auxiliary pressure medium tank whenever the pressure medium source is supplying sufficient pressure.

The pressure medium-powered cylinder assembly can preferably be brought into pressure medium flow connection with a pressure compensation port or a pressure compensation tank via a/the associated valve assembly in order to actuate the clutch, preferably to engage it.

It is advantageous to provide a throttle point in a pressure medium flow connection associated with the pressure medium-powered cylinder assembly, so that an auxiliary clutch-engaging time and/or an auxiliary clutch-disengaging time can be set.

In regard to the auxiliary pressure medium tank, it is proposed that it be designed to store a volume of pressure medium which is sufficient for at least two, preferably for at least three to five clutch actuations, each actuation including one disengagement of the pressure medium-powered cylinder assembly. In the case that the auxiliary tank holds compressed air, a suitable volume would be, for example, approximately 2 liters or so.

The invention under the first, second, and third aspects can be used independently of the type and design of the pilot/automatic control valve assembly, of the type and design of the conventional measuring system for detecting the actual actuation state, and of the type and design of any pilot/automatic control unit which may be provided. Thus, the invention can be used in an actuation system with a hydraulic measuring cylinder assembly and with a pilot/automatic control valve assembly working according to the principle of the pressure scale as described in DE 197 16 600 in order to make emergency actuation of the clutch possible without the need to design the hydraulic measuring cylinder assembly as a hydraulic slave cylinder assembly or without the need to provide a separate hydraulic slave cylinder assembly. The invention will, however, be especially advantageous when it is associated with electrical pilot/automatic control valve assemblies or magnetic pilot/automatic control valve assemblies comprising at least one proportional pilot/automatic control valve or at least one electrically actuated switching valve (such as that described in U.S. Pat. No. 5,004,086). Various designs and functional principles which can be considered for the actuation system and various possibilities for representing the actual value and the control input are described in DE 197 16 600.

The invention also pertains to a drive train for a motor vehicle, especially a commercial motor vehicle, comprising a drive unit, a transmission, a friction clutch installed between the drive unit and the transmission, and an actuation system of the type described above.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

FIG. 4 shows a summary of the differentiatable criteria which can be taken into account in an error analysis;

FIG. 5 shows a summary of the differentiatable criteria after simplification in comparison to the summary of FIG. 4; and FIG. 6 shows a table which lists the states of an enable relay and of a shutoff valve as a function of the various possible errors for the purpose of correcting these errors to allow emergency actuation of the clutch.

DETAILED DESCRIPTION OF THE PRESENTLY PREFERRED EMBODIMENTS

Figure 1:
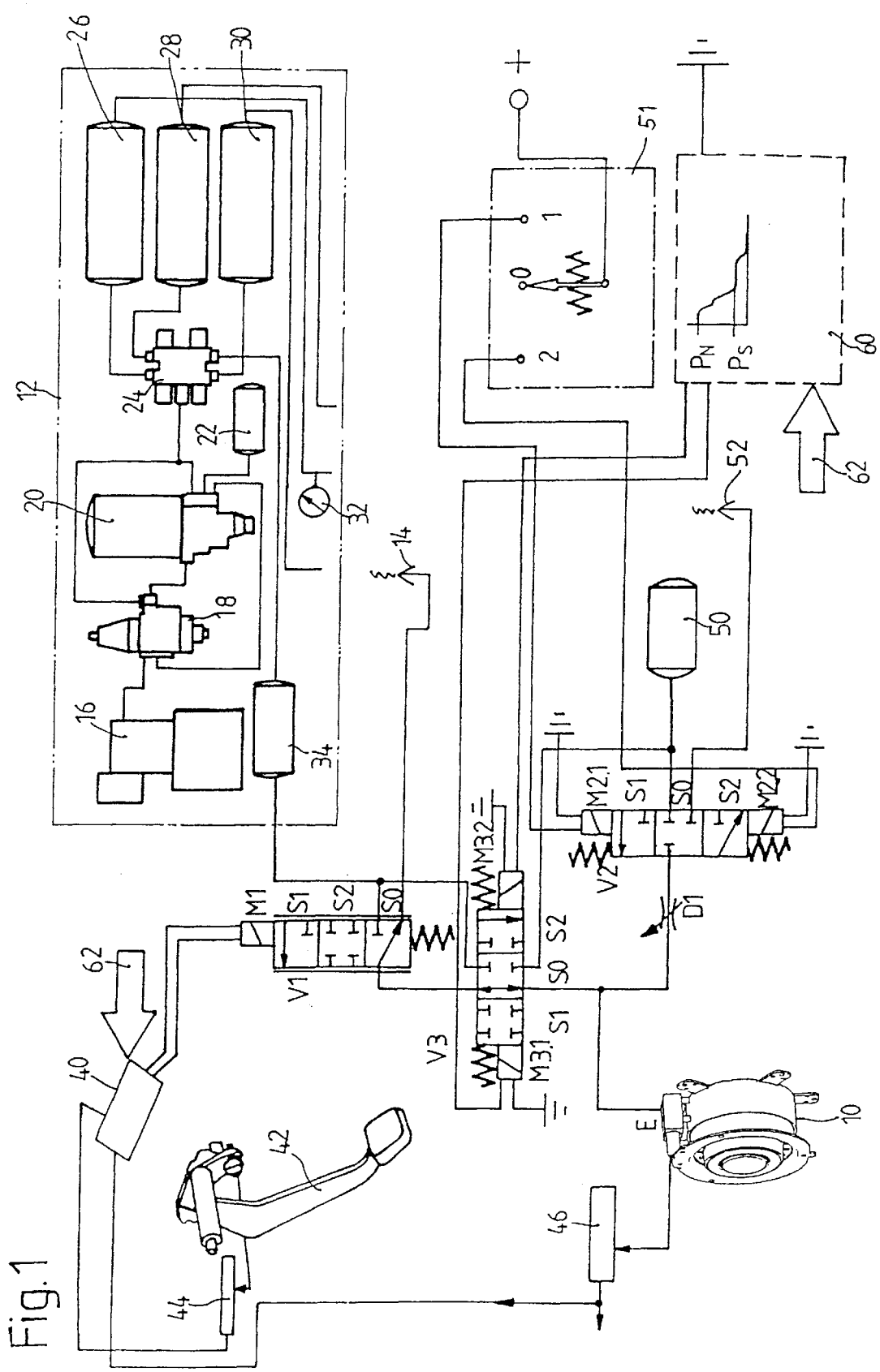
FIG. 1 shows a schematic diagram of an actuation system for the friction clutch of a commercial vehicle.

FIG. 1 shows the system components of a commercial vehicle, including a clutch actuation system in accordance with a preferred embodiment of the invention. The actuation system comprises a pressure medium-powered cylinder 10, designed as a ring-type pneumatic cylinder, installed in a housing bell between a transmission and an internal combustion engine. This cylinder serves to actuate a friction clutch, which connects the transmission to the engine. The pressure medium-powered cylinder 10 has a pneumatic connection E, which leads to a compressed air or pneumatic source 12 and to a pressure compensation port 14 by way of a mode valve V3, formed by a 3/4-way valve, and a pilot/automatic control valve V1, which is designed here as a 3/3-way proportional valve. The pneumatic source 12 includes various components known in and of themselves, including, for example, a belt-driven compressor 16; a pressure-regulating valve 18; an air drier 20; a compressed air tank 22 associated with the air drier and serving as a backflush device; a four-circuit safety valve 24, which serves to ensure the safety of the compressed air circuits assigned to the vehicle brakes; a compressed air tank 26 to supply a first brake circuit; a compressed air tank 28 to supply a second brake circuit; a compressed air tank 30 to supply a parking brake and possibly other receivers; and a pressure indicator 32, which displays the pressure in the first and second brake circuits. The pressure source 12 also includes a compressed air tank 34, which serves to supply the pneumatic cylinder 10 by way of the valves V1 and V3.

The mode valve V3 can assume any one of three switching states. In normal operating mode S0, the mode valve V3 is in normal switch position S0 in which the valve V1 is connected in terms of the flow of compressed air via valve V3 to the pneumatic cylinder 10. The cylinder can be operated by the pilot/automatic control valve V1, which either allows compressed air to flow from the tank 34 to the pneumatic cylinder 10 (position S1 of the pilot/automatic control valve V1), allows compressed air to escape from the pneumatic cylinder 10 through the pressure compensation port 14 (position S0 of the pilot/automatic control valve V1), or allows the pneumatic cylinder 10 to be held temporarily in a disengaged position by closing off the cylinder space of the pneumatic cylinder (position S2 of the open/closed-loop control valve V1). The pilot/automatic control valve operates the pneumatic cylinder 10 under the instructions of a pilot/automatic control unit 40, which actuates a proportional magnet M1 as a function of a control input (a desired value), specified by a clutch pedal 42 and a signal transmitter connected to it, possibly a potentiometer 44, and also as a function of an actual value representing the disengaged position of the pneumatic cylinder or the actual value of the position of a disengaging bearing assembly connected to the cylinder. This actual value is detected by a magnetic distance sensor or an electrical distance sensor (possibly a potentiometer) and is sent as an electrical signal, like the electrical signal representing the control input, to the pilot/automatic control unit 40. In conjunction with the valve V1 and the distance sensor 46, the pilot/automatic control unit forms an automatic control circuit, which ensures that, through the corresponding actuation of the pneumatic cylinder 10 via the valve V1, any difference which may exist between the control input and the actual value is corrected. Instead of a proportional valve V1, it would also be possible to use one or more switching valves, such as those described in U.S. Pat. No. 5,004,086. It is also conceivable that a pilot/automatic control valve assembly operating mechanically or hydraulically could be used instead of a pilot/automatic control valve assembly operating electrically or magnetically; reference can be made here to DE 197 16 600.

The actuation of the pneumatically-powered cylinder 10 described above via the pilot/automatic control valve V1 can be interfered with or rendered impossible for many reasons. For example, it can be that the pilot/automatic control valve (or, in general, a pilot/automatic control valve assembly) cannot function and must be repaired or replaced. In addition, it is also possible that the electronic control system of the vehicle, specifically the pilot/automatic control unit 40 is not working properly. It could also be that the electrical signal transmitter 44 or the distance sensor 46 is not working properly. Finally, it could be that the pneumatic source 12 is unable to provide enough pneumatic pressure to actuate the clutch, perhaps because there is a defect, specifically a leak in, for example, the tank 34, or perhaps because the vehicle has been parked for a long period of time, during which, as a result of leaks in the pneumatic system, which can hardly be avoided in practice, the tank 34 has become empty. In the latter case, when the problem is merely that the tank 34 is empty and the pneumatic source 12 still functions properly in itself, putting the compressor into operation by starting the internal combustion engine can fail if the truck was parked with a gear engaged and this gear, because of the tension on the drive train, cannot be disengaged without actuation of the clutch.

To provide a remedy here, the system of FIG. 1 shows an auxiliary actuating assembly for the auxiliary actuation of the friction clutch via the pneumatic cylinder 10. The auxiliary actuating assembly comprises an auxiliary compressed air tank 50, which can supply the pneumatic cylinder 10 with compressed air when the pneumatic source 12, specifically the tank 34, cannot provide any compressed air at all or cannot provide it at a sufficient pressure. For this purpose, a 3/3-way switching valve V2 is provided, which can be actuated electromagnetically, and which is preloaded by a spring in a normal operating position S0, in which the compressed air flow connection leading via a throttle D1 between the tank 50 and the pneumatic cylinder 10 is blocked.

The valve V2 can be operated manually by the driver by means of a switch 51 located in the driver's cab of the vehicle; the driver can select either a position S1 or a position S2. In position S1, a connection is established for the flow of compressed air between the auxiliary compressed air tank 50 and the pneumatic cylinder 10 via the throttle D1. In position S2, a connection is established for the venting of compressed air from the pneumatic cylinder 10 to a pressure compensation port 52. In a manner completely independent of the electronic valve control unit 40 and the valve V1, therefore, the switch 51 makes it possible for the pneumatic cylinder 10 to be operated manually by means of valve V2 with the help of the compressed air stored in the auxiliary compressed air tank 50 or, alternatively, with the help of the compressed air provided by the pneumatic source 12, specifically the tank 34, as a function of the position of the mode valve V3. In an intermediate position of the switch, the valve V2 assumes the normal operating position S0.

If the mode valve V3 is switched by electrical signal from a control/diagnosis unit 60 to an isolating position S2 against the preloading force of a spring, which holds the valve under pretension in the normal operating position S0, then the connection between the cylinder 10 and the pilot/automatic control valve V1 is interrupted. In addition, a pneumatic flow connection is established via the mode valve V3 between the tank 34 on the one hand and the auxiliary compressed air tank 50 and a connector on the valve V2 on the other, thus establishing a parallel connection between the auxiliary compressed air tank 50 and the compressed air tank 34 of the pneumatic source 12. The result is that the pneumatic cylinder 10 can now be actuated in auxiliary mode by means of switch 51, which moves the valve V2 between its positions S1, S0, and S2. If the pneumatic source 12 is in good working order, the clutch can be engaged and disengaged as often as desired by the pneumatic cylinder. The control/diagnosis unit 60 will switch the mode valve V3 into position S2 when the pressure provided by the pneumatic source 12 is sufficient and when at the same time a defect in the function of the valve V1 and/or in the function of the pilot/automatic control unit 40 has been detected.

If the control/diagnosis unit 60 recognizes that the pneumatic pressure provided by the pneumatic source 12 is not sufficient or that the pneumatic source cannot provide any compressed air at all at the moment in question, it switches the mode valve V3 into position S1, in which the part of the pneumatic system comprising the pneumatic cylinder 10, the valve V2, and the auxiliary tank 50 is separated from the valve V1 and the pneumatic source 12. It is now possible for auxiliary actuation of the pneumatic cylinder 10 to occur, as long as the auxiliary compressed air tank 50 can provide sufficient pressure. The volume of the auxiliary compressed air tank 50, relative to a specified standby air pressure, is preferably large enough that the compressed air stored in the tank 50 is sufficient to actuate the clutch at least twice, each actuation including one disengagement of the piston of pneumatic cylinder 10, even more preferably at least 3–5 such clutch actuations. Depending on the volume of the pneumatic cylinder, a compressed air volume of the auxiliary compressed air tank of at least 2 liters can be provided for this purpose.

Instead of the automatic switching of the mode valve V3 by the control/diagnosis assembly (which is possibly the vehicle's electronic control system) 60, which is connected to the pilot/automatic control unit 40 for data communications over a data bus specially designed for the transmission of sensor data (CAN bus) 62, it is also possible to design the system so that the valve V3 can be switched manually.

When valve V2 is in position S0, the auxiliary compressed air tank 50 can be refilled with compressed air by switching the valve V3 into position S2, in which, if sufficient pneumatic pressure is being made available by the pneumatic source 12, compressed air is sent from the pneumatic source 12 to the auxiliary compressed air tank 50 and stored there.

In the following, various possible states and situations and their relationship with the system shown in FIG. 1 are explained by way of example. The pressures and pressure thresholds cited in the following are intended only as examples, but they can be taken as (typical) values, which frequently occur in practice.

A normal operating situation is characterized in that the pressure in the secondary receiver circuit comprising the pneumatic subsystem assigned to the pneumatic cylinder is sufficiently large, such as in the range of 8.1–8.5 bars.

Sufficient pressure for clutch actuation is then available at the outlet of the tank 34 or at the associated connection of the proportional pilot/automatic control valve V1. Under the assumption that all components of the system are functioning properly, then, upon actuation of the clutch pedal 42, a desired value is generated for the disengaging bearing, and it is compared in the unit 40 with the actual as value of the disengaging bearing supplied by the distance sensor 46. If the signals deviate, the valve V1 is driven by the unit 40 and moved to the appropriate position, such as out of position S0 into position S1. The pneumatic pressure allowed through by valve V1 then arrives at the inlet E to the pneumatic cylinder, since mode valve V3, which is in position S0 (intermediate position) is not receiving any power. A corresponding disengaging process thus occurs. When the clutch pedal is released, a clutch engaging process occurs in analogous fashion. To hold the clutch, the proportional pilot/automatic control valve V1 assumes the intermediate position S2, which closes off the pneumatic cylinder 10. Under normal conditions, the auxiliary compressed air tank 50 is filled with compressed air to a pressure of greater than 8.1 bars.

Normal clutch functions, i.e., actuation of the clutch by means of the pneumatic cylinder, are possible down to, for example, a minimum pressure of 5.0 bars. A pneumatic clutch actuation system is frequently used in conjunction with a pneumatically shifted transmission. A certain minimum pressure is also required for the proper, reliable shifting of the transmission, and in certain cases this pressure can be even greater than that required for actuating the clutch. The pressure in the secondary receiver circuit, possibly comprising also the transmission shifting actuators, is therefore monitored by the control/diagnosis unit preferably also with respect to the minimum pressure relevant for the actuation of the transmission. If the pressure falls below a predetermined threshold, the control/diagnosis unit will preferably show an appropriate warning on the dashboard of the vehicle. Appropriate auxiliary transmission actuating measures can be provided, which allow a shifting of gears at least on an emergency basis, possibly between only some of the gears of the transmission. In some cases the normal clutch function may still be available.

If the pressure in the secondary receiver circuit falls below the pressure threshold of, for example, 5.5 bars required for actuation of the clutch, the control/diagnosis unit 60 will also transmit a warning to this effect. If no gear is engaged, then, under the assumption that the pneumatic source 12 is functioning properly in and of itself and only the tank 34 is empty because of the length of time the vehicle has stood idle, it is possible for the engine to be started normally, so that the tank 34 (or the other tanks of the pressure source 12) can be filled again by the compressor 16. Normal driving is then possible.

If, however, it is no longer possible for the pneumatic source 12 to function properly because of a major leak, for example, or because of the failure of the compressor 16 or of the automatic pressure control valve 18, then the compressed air stored in the auxiliary compressed air tank 50 allows at least an emergency start of the vehicle, enough, for example, to allow the vehicle to leave a danger zone. Because of the limited supply of compressed air, however, only a limited number of clutch actuations is possible. In the case of a pneumatically shifted transmission, a pneumatic transmission actuation will then probably no longer be possible, so that, under certain conditions, the starting gear of the transmission will have to be engaged manually.

With respect to the auxiliary actuation of the clutch, the following measures are provided in the system according to FIG. 1. When the ignition is turned on, the control/diagnosis unit 60 recognizes that the pressure in the secondary receiver circuit has fallen below, for example, 5.5 bars. The control/diagnosis unit then powers up the mode valve V3 at M3.1 and moves the mode valve out of position S0 and into position S1, so that the pneumatic cylinder 10, the valve V2, and the tank 50 are completely shut off from the compressed air system. By moving switch 51 from switch position 0 to switch position 1, the valve V2 is powered up at M2.1, and the position thus switches from S0 to S1. The compressed air from the auxiliary compressed air tank 50 can then flow through the throttle D1, which adjusts the disengaging speed of the clutch, to the inlet E of the pneumatic cylinder. The pneumatic cylinder disengages at a relatively slow speed in accordance with the setting of the throttle D1 to its maximum disengaging position. By changing switch 51 to position 0, the power to M2.1 of the valve V2 is cut off, so that the valve V2 moves back from position S1 to position S0, and the clutch is accordingly held in the disengaged position. After the gear has been engaged or the engine has been started, the clutch can be engaged again by moving the switch 51 from position 0 to position 2, in which the valve V2 is powered up at M2.2 and accordingly the valve V2 is shifted to position S2, in which the compressed air in the pneumatic cylinder 10 can escape through the throttle D1 and the valve V2 to the pressure compensation port 52.

When a gear has been engaged but cannot be disengaged because of the tension on the drive train and insufficient pneumatic pressure, which makes it impossible for the clutch to be actuated via valve V1 and thus also impossible for the engine to be started, the system of FIG. 1 makes possible the following sequence of events. After the ignition has been turned on, the control/diagnosis unit recognizes that the pressure in the secondary receiver circuit has fallen below 5.5 bars. It then powers up the mode valve V3 at M3.1 and moves the mode valve from position S0 to position S1. In a manner similar to that described above, the valve V2 can then be brought into position S1 by operation of the clutch switch 51 in order to move the pneumatic cylinder out to its position of maximum disengagement. Now the gear can be released. The internal combustion engine can now be started normally, so that the pneumatic source 12 can be put into operation to refill the compressed air tank 34 and possibly the other tanks of the pneumatic source 12. Before starting the engine, the switch 51 should first be moved to position 2 in order to engage the clutch again; then the switch should be moved to position 0. After the proper pneumatic pressure has been reached in the secondary receiver circuit, the control/diagnosis unit will no longer provide the valve V3 with power, with the result that this valve moves back to position S0 under the preloading force of the spring.

A situation can also occur in which the pilot/automatic control unit 40 and/or the proportional pilot/automatic control valve V1 have failed, whereas at the same time the pneumatic source 12 is still able to provide enough pressure. If the control/diagnosis assembly recognizes a situation like this (malfunction in the pilot/automatic control unit and/or in valve V1, but the pressure in the secondary receiver circuit is greater than, for example, 8.1 bars), then the control/diagnosis unit 60 sends power to the mode valve V3 at M3.2 so that this valve moves from position S0 to position S2, in which the tanks 34 and 50 are connected in parallel with respect to a compressed air connection of valve V2. By moving switch 51 to position 1, it is possible to send power to the valve V2 at M2.1 or, by moving it to position 2, to send power to valve V2 at M2.2. The valve V2 can thus be brought in position S1 or S2, so that either compressed air is supplied to the pneumatic cylinder 10 or compressed air is discharged from the pneumatic cylinder 10 via the pressure compensation port 52. As long as the pneumatic source 12 can supply enough operating pressure, the clutch can be engaged and disengaged as often as desired, or, by moving the switch 51 back to position 0 and accordingly moving valve V2 back to position S0, the clutch is maintained in a "hold" position. As a result, the so-called limp-home function is realized.

It should also be mentioned that the switch 51 or a switch assembly fulfilling the function of switch 51 (such as an assembly comprising one switch for engaging and another switch for disengaging) can be connected to the clutch pedal 42, so that emergency clutch actuation can be accomplished via the clutch pedal.

In summary, the invention offers the following advantages, among others:

It is possible to provide functional redundancy for actuation of the clutch at favorable cost.

The invention offers a limp-home function after failure of the electronic valve control circuitry which normally controls the clutch and/or after failure of one of the pilot/automatic control valve assemblies controlled by this circuitry.

A simple way is provided of actuating the clutch on an emergency basis so that the vehicle can be driven away from a dangerous area even after the compressed air in the vehicle's compressed air system has failed.

In a situation where a gear is engaged and the drive train is under tension, a simple way is provided of creating the possibility of performing at least one emergency clutch actuation in order to disengage a gear and thus to allow the engine to be started even after the compressed air of the compressed air source has failed.

The preferred embodiment described above is also characterized by the following advantages:

After use, the auxiliary compressed air tank 50 is regenerated by refilling under instructions from the control/diagnosis unit 60, which detects a specific condition, for example, in the regular compressed air circuit, this being accomplished preferably automatically and without the participation of the driver.

At least one pneumatic valve, namely, the mode valve V3 which controls the various modes of the actuation system, is activated automatically by the control/diagnosis unit 60 without the driver's participation.

The auxiliary compressed air tank 50 is connected pneumatically to an auxiliary compressed air circuit with at least two pneumatic valves in such a way that the auxiliary compressed air circuit can be activated by a manually operated switch in complete independence of the pilot/automatic control unit (electronic valve control circuitry) and the pilot/automatic control valve (of the pilot/automatic control valve assembly).

The auxiliary compressed air tank is installed in the compressed air system in such a way that no secondary receivers are connected directly to it. As a result, the use of a shutoff or switching valve assembly with preferably very high resistance to leakage can ensure that the compressed air stored in the auxiliary compressed air tank will last for a long time.

In the event that the pilot/automatic control unit 40 and/or the pilot/automatic control valve V1 fails, the clutch can be actuated on an emergency basis as many times as desired as long as the compressed air source is functioning normally.

Figure 2:
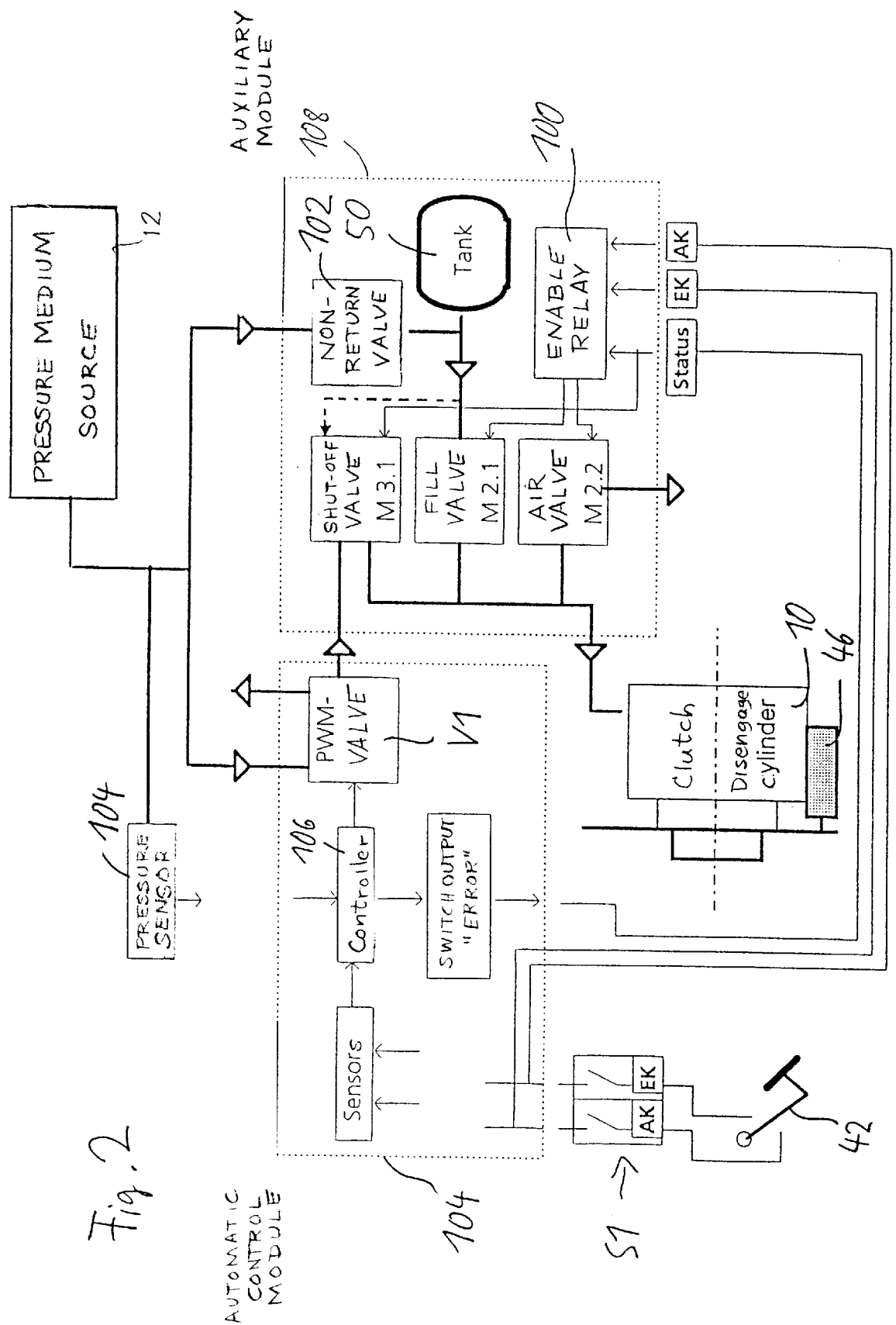
FIG. 2 shows a schematic diagram of another example of an actuation system for the friction clutch of a motor vehicle.

Another exemplary embodiment of a clutch actuation system according to the invention is shown in the form of a schematic diagram in FIG. 2. In this actuation system, a switch assembly AK and EK, designated S1 overall, is connected to the clutch pedal 42 in such a way that auxiliary clutch actuation can be executed with the intermediate agency of the clutch pedal. For this purpose, when the clutch pedal is depressed, a disengage signal is generated by the switch AK, and when the clutch pedal is released, an engage signal is generated by the switch EK, these signals being sent to an enable relay 100. The enable relay serves to actuate, in auxiliary actuation mode, a filling valve M2.1 and an air valve M2.2. The filling valve M2.1 and the air valve M2.2 work together with a shutoff valve M3.1 and a nonreturn valve 102 to form a valve assembly which replaces the valves V2 and V3 of FIG. 1, this assembly fulfilling essentially all of the same function as valves V2 and V3. The nonreturn valve 102 makes it possible for the tank 50 to be filled whenever the pneumatic source 12 supplies sufficient pressure.

In auxiliary actuation mode, the shutoff valve M3.1 disconnects the pilot/automatic control valve V1, which can be designed as a pulse width-modulated signal-driven PWM valve, from the part of the pneumatic system comprising the filling valve M2.1, the air valve M2.2, the tank 50, and the disengaging cylinder 10. If the auxiliary actuation mode has become necessary because the pneumatic source 12 is not supplying enough pressure, then the nonreturn valve 102 isolates this part of the pneumatic system from the part of the pneumatic system comprising the pressure source and the pilot/automatic control valve V1.

The change in the position of the shutoff valve M3.1 between an open position, in which the PWM valve V1 is connected to the disengaging cylinder 10, and a blocking position, in which the subsystems of the pneumatic system mentioned above are cut off from each other, is accomplished as a function of a status signal, which indicates the status of an automatic control module 104, which includes the PWM valve V1. This automatic control module is designed with a self-monitoring function and transmits a status signal "OK" when, first, a pressure sensor 105 shows that sufficient pneumatic pressure is being made available from the pressure source 12 and, second, when the self-monitoring of the automatic control circuit comprising the automatic controller 106, the valve V1, the disengaging cylinder 10, and the disengaging distance sensor 46 shows that a deviation between a desired disengaging distance value and an actual disengaging distance value can be corrected within a predetermined adjusting time interval. If the pressure sensor 105 does not detect sufficient pressure, however, and/or if the self-monitoring function finds that a deviation between the desired and actual values of the disengaging distance could not be corrected within the predetermined adjusting time interval, the automatic control module 104 transmits a status signal "not OK".

The status signal is sent to the enable relay 100 and to the shutoff valve M3.1. As long as the status signal has the value "OK", the shutoff valve is in the open position, so that the disengaging cylinder 10 can be actuated by the PWM valve V1. Furthermore, if the status signal has the value "OK", the enable relay 100 is held in a switch position in which the disengaging and engaging signals from the switch assembly S1 are not being allowed to pass through to the filling valve M2.1 or to the air valve M2.2, which means that auxiliary actuation is blocked.

If, however, the status signal assumes the value "not OK", then the enable relay 100 is switched to a position in which the disengaging and engaging signals are allowed to pass through to the valves M2.1 and M2.2, so that auxiliary actuation is enabled. For this value of the status signal, the shutoff valve M3.1, which is driven directly by the status signal, is switched into the blocking position, so that the PWM valve V1 is disconnected from the disengaging cylinder 10.

The status signal is preferably an electrical signal, and the values "OK" and "not OK" are encoded by values for current or voltage. A current value or a voltage value of zero or approximately zero is preferably used for the value "not OK", to force the enabling of auxiliary actuation even when a status line, which connects the automatic control module 104 to the auxiliary module 108 comprising the tank 50, the relay 100, the nonreturn valve 102, and the valves M3.1, M2.1, M2.2, becomes defective or is not connected properly to the automatic control module 104 and/or to the auxiliary module 108 (because of, for example, a defective plug connector).

Figure 3:
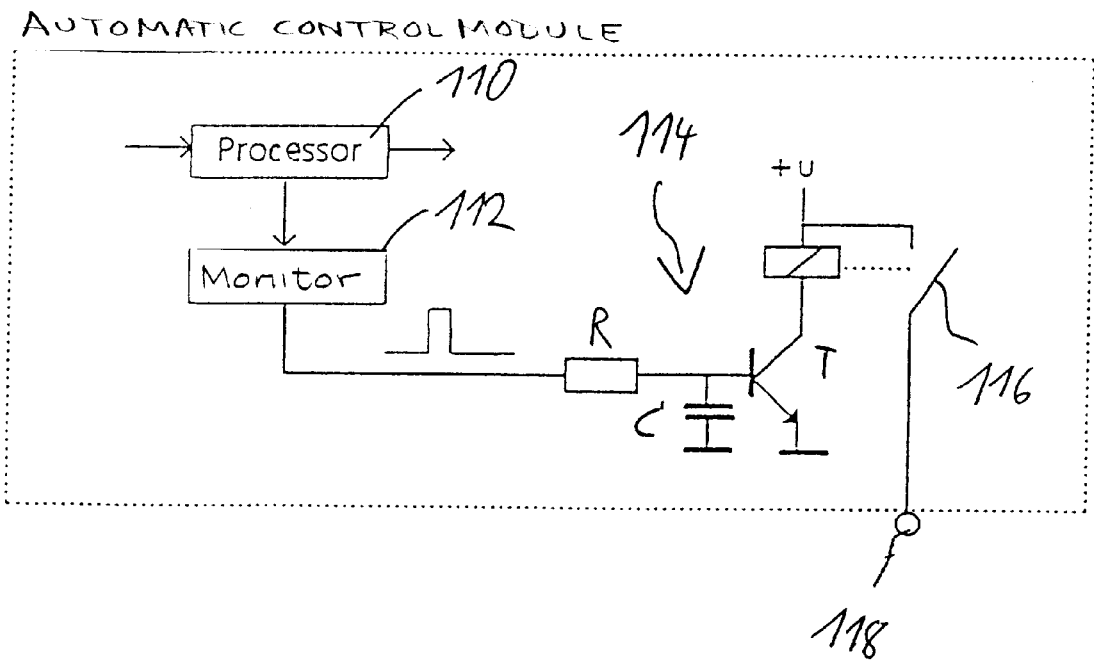
FIG. 3 shows a block diagram of a possible design of an automatic control module of the actuation system with respect to the monitoring or the adjustment of an actual position value to a desired position value of the pressure medium-powered cylinder.

FIG. 3 shows schematically how the self-monitoring function of the automatic control module can be realized. A processor 110, which performs the actual automatic control, can be provided; via a monitoring unit 112, it transmits voltage pulses to a circuit assembly 114 whenever the actual disengaging distance value, measured against an agreement criterion, corresponds to the desired disengaging distance value. A relay switch contact 116 is then kept closed continuously, so that a predetermined voltage U is present at a terminal 118, which transmits the status signal. If the pulses are not received, however, the relay switch contact 116 opens in accordance with a time constant predetermined by a resistor R and a capacitor C (the output current of the transistor T drops to zero), and at terminal 118 there is accordingly no longer any voltage, corresponding to the "not OK" value of the status signal.

The following is necessary to complete the description of the assembly according to FIG. 2. The pedal 42 can be an auxiliary pedal with purely a switching function for the realization of the emergency clutch actuation, especially when the assembly belongs to a completely automatic vehicle, in which, during normal operation, only two pedals, namely, a brake pedal and a gas pedal, for example, are to be used. In the case of a standard vehicle, in which a clutch pedal, a brake pedal, and a gas pedal are used, the pedal 42 is preferably the clutch pedal, which is equipped with a distance sensor for setting the desired disengaging distance value and also with the above-mentioned two switches AK and EK to make auxiliary actuation possible. The signals sent by the switches AK and EK can also be evaluated by the automatic control circuit to define a state of complete engagement and a state of complete disengagement.

In broken line, FIG. 2 shows a pneumatic connection to the shutoff valve M3.1. Pressure is thus applied from tank 50 to the shutoff valve to preload it in a predetermined direction, namely, in the blocking position. As an alternative, the valve could also be held under mechanical pretension.

The present invention or at least various component aspects of the present invention are based on the following considerations, among others:

An automatic, electrically controlled disengaging system for motor vehicle clutches, possibly a pneumatic disengaging system, such as that shown in FIG. 2, depends for its proper operation on the good working order of the automatic control module circuitry, of the sensors which supply values to the automatic controller, and of the compressed air supply system of the vehicle. Even though the automatic control module circuitry and the pilot/automatic control valve assembly, i.e., possibly the selected PWM valve, are extremely reliable, it is nevertheless necessary to anticipate the possibility that the sensors or the connecting elements (electrical lines, plug connectors) can fail, which would then prevent the vehicle from being operated.

In general, as a way of guaranteeing that the vehicle will always be available for use, measures should be taken to ensure that, if any one of the cited components fails, it will still be possible to actuate the vehicle's clutch with a minimum of effort. It is an advantage if the driver can exercise this function in the accustomed way, that is, in the way in which a clutch actuation system in good working order is normally operated.

As a rule, the goal is to achieve a system which is user-friendly. In particular, the driver should be clearly informed of any system failure. A smooth, uninterrupted transition to the auxiliary driving mode is also frequently desirable, for then it is unnecessary to stop the vehicle, to actuate emergency switches, or to fold down the emergency pedal. As a rule, a certain decrease in driving convenience can be tolerated until the nearest garage has been reached.

The basic function on which an electrically controlled disengaging cylinder depends is the good working order of the automatic position control circuit. The criterion used to show that the automatic position control circuit is functioning properly can be, for example, the ability of the circuit to correct a deviation between the actual and the desired signals to a satisfactory degree. The automatic position control circuit is in good working order when it is able, in the presence of pressure medium at sufficient pressure, to correct a deviation between the actual value and the desired value, that is, between the actual position and a desired position of the disengaging cylinder, within a defined adjusting time. If the automatic control circuit is unable to do this, then the position of the disengaging cylinder can no longer be adjusted. The cause of this situation is now no longer important; it makes no difference whether, for example, a sensor, an electronic component, or the automatic control valve is defective. There is therefore no need for a more differentiated error analysis, insofar as it pertains to the recognition of an emergency driving situation. It is sufficient for a status signal or a switch signal with the value "not OK" to be generated. It is advantageous for this signal to be generated within the automatic control unit itself, but care must be taken to ensure that this signal can be generated even after most if not all of the electronic circuitry of the module has failed. It is advantageous for this signal to be generated by self-monitoring, electromechanical means, as illustrated in FIG. 3. A high degree of reliability is thus achieved.

In this regard, it is also advisable to provide means for sensing the presence of sufficient auxiliary energy, i.e., a sufficient supply of compressed air, so that the error analysis indicated above is valid, for, without a supply of compressed air, the automatic control circuit generates an error signal immediately. For applications in motor vehicles such as commercial trucks with a CAN bus, this type of information is probably available already. But it is also possible to provide a separate pressure sensor (e.g., pressure sensor 104) to monitor the compressed air supply of the automatic control module.

On the basis of these considerations, the embodiment according to FIG. 2 is designed as follows: Emergency driving mode is initiated automatically when the self-monitoring function of the automatic control module (or in general of a control/diagnosis assembly such as an "onboard diagnosis" unit) detects a system error. The associated switch output "error" (terminal 118) then responds, and the enable relay 100 is actuated to allow the valves M2.1 and M2.2 to switch in accordance with the control signals being sent by switches AK and EK. The driver is then informed of this system status by means of, for example, a visual indicator and/or a warning sound. He is then able to use the pedal to move the clutch into its end position and to do so needs to make hardly any adjustments in the way he operates the clutch, because the clutch is still operated in the same way as before with the clutch pedal.

Measures could also be provided to allow the driver to switch manually from normal to emergency driving mode. This is ultimately a question of cost and a question of system philosophy. As a result of manual changeover to emergency driving mode, it would be possible to eliminate the means provided for sensing the supply pressure. In addition, there would be no need to have a special self-monitoring function built into the automatic control module. It would be completely sufficient in this case to derive an output signal from the automatic control circuit which turns on a signal lamp or the like and which represents the presence of a condition of persistent deviation between the desired disengaging distance and the actual disengaging distance. The warning lamp could therefore be actuated by, for example, a difference signal representing the deviation.

The auxiliary module is preferably built of simple, inexpensive components and, as long as supply pressure is present, it allows unlimited "emergency clutching". In the absence of a compressed air supply, it will still allow several clutch actuations, depending on the size of the tank 50.

Power cannot be sent to the valves M2.1, M2.2, which are possibly designed as switching valves, until the enable relay 100 has been set via the status signal input. Then the filling valve M2.1 and the air valve M2.2 can be actuated by the EK pedal switch and the AK pedal switch. The speed at which the clutch is engaged and disengaged depends on the open cross section of the valves and of the compressed air lines as well as possibly on throttle sections provided in them. It is not excluded that, in place of a "binary" actuation of the valves M2.1 and M2.2, according to which the valves change only between a blocking position and an open position, an "analog" actuation could also be provided in order to make better use of the effective open cross section of the valve in question in its open condition.

Because the auxiliary module is an emergency module, the enable relay and the air valve in particular should be extremely reliable, and it is best that they be designed for continuous duty. The same applies preferably also to the shutoff valve and the filling valve.

When designing an auxiliary actuation assembly, it is useful to analyze all the possible errors which can occur in the form of an "error tree". This makes it possible to examine the situations resulting for the driver, for the clutch position, and for the transmission status as a function of all the participating system components.

The diagram of FIG. 4 shows a series of criteria which can be taken into account in an error analysis. In the various lines of each column, various criteria, conditions, or situations are indicated, which can be taken into account in an error analysis. Each entry in a column can be considered in combination with each entry of the other columns in order to perform an error analysis which is as complete as possible.

When all combinations are considered and checked for the resulting situations and when all possible changes of state are included for each parameter, the resulting error criteria matrix becomes relatively complicated. Because, with respect to the limp-home function, it is irrelevant whether, for example, it is a sensor or a pilot/automatic control valve which is defective, the error analysis does not have to be so highly differentiated as indicated in the overview of FIG. 4.

FIG. 5 shows an overview of a set of criteria which has been simplified or summarized in an appropriate manner.

Out of all the possible combinations of the individual criteria or conditions or situations, it can be seen that the auxiliary actuation in the sense explained above should always engage in the event that the automatic control circuit fails (including a sensor failure) or the supply pressure is absent. What results is the error logic shown in the table of FIG. 6 for the enable relay and the shutoff valve. The table can be interpreted as a diagram of state for the enable relay and the shutoff valve as a function of the possible error states.

According to this error logic, the emergency driving mode is also enabled when the status line from the automatic control module is defective (for example, there is no control current because of a defective cable and/or defective plug connector).

In the table of FIG. 6, "pressure circuit" refers to the pressure detected by the pressure sensor 105; "electronics" refers to the automatic control module 104; and "status line" refers to the line connecting the automatic control module 104 to the auxiliary module 108. The abbreviation "i.O." stands for "OK", and the abbreviation "n.i.O." stands for "not OK". In the overviews of FIGS. 4 and 5, the "status of the condition display" pertains to a display unit which shows the condition of the automatic control circuit and possibly to a visual signal derived from the difference signal.

In summary, the invention pertains to an actuation system for a friction clutch installed in the drive train of a motor vehicle between a drive unit and a transmission, including a pressure medium-powered cylinder assembly which works together with a pilot/automatic control valve assembly. In order to actuate the actuation system in an emergency, the auxiliary actuating assembly includes an auxiliary actuating valve assembly, which can be switched into a pressure medium feed position and/or into a pressure medium discharge position. Via the intermediate agency of this valve assembly, the pressure medium-powered cylinder assembly can be connected with the pressure medium source or a separate auxiliary pressure medium source (pressure medium feed position of the valve assembly) to allow the auxiliary actuation of the clutch, or with a pressure compensation port or a pressure compensation tank (pressure medium discharge position of the valve assembly). According to another aspect, a shutoff or switching valve assembly is provided, which cooperates with a pressure medium tank or pressure medium source and/or a separate auxiliary pressure medium tank of the auxiliary actuation assembly. By the intermediate agency of this valve assembly, a pressure medium subsystem comprising at least one pressure medium receiver is connected to the tank, and the tank can be isolated from the pressure medium subsystem in order to counteract the gradual emptying of the tank as a result of leakage in the pressure medium subsystem during long idle periods of the vehicle. According to yet another aspect, the auxiliary actuating assembly includes an auxiliary pressure medium tank separate from the pressure medium source, which tank can be connected with the pressure medium source via an associated valve assembly in order to fill the auxiliary pressure medium tank with pressure medium. This tank can also be connected via the valve assembly with the pressure medium-powered cylinder assembly in order to actuate the clutch, preferably to disengage it. The tank can be isolated from the rest of the pressure medium system, including the pressure medium source and the pressure medium-powered cylinder assembly, by the valve assembly in order to hold the pressure medium in the auxiliary pressure medium tank for use in emergency actuation situations.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

We claim:

1. An actuation system for a friction clutch installed in the drive train of a motor vehicle, said actuation system comprising
    a pressure medium powered cylinder assembly for actuating the friction clutch,
    means for providing a control input representing a desired actuation state of said means for providing an actual value representing the actual actuation state of said clutch,
    a main pressure medium source,
    a pilot/automatic control valve assembly which supplies pressure medium to said pressure medium powered cylinder assembly from said main pressure medium source as a function of said control input and said actual value,
    a pilot/automatic control unit which operates said pilot/automatic control valve assembly,
    an auxiliary pressure medium source, and
    an auxiliary actuating valve assembly for actuating said clutch independently of said pilot/automatic control valve assembly, said pilot/automatic control unit, and an instantaneous pressure medium pressure of said main pressure medium source, wherein said auxiliary actuating valve assembly can be switched into a pressure medium feed position, wherein said pressure medium powered cylinder assembly can be connected to one of said main pressure medium source and said auxiliary pressure medium source, and into a pressure medium discharge position, wherein said pressure medium powered cylinder assembly can be connected to one of a pressure compensation port and a pressure compensation tank, said auxiliary actuating valve comprising a mode valve assembly which can be switched between a normal position, wherein said pilot/automatic control valve assembly is in pressure medium flow connection with said pressure medium powered cylinder assembly, and at least one isolating position, wherein said pilot/automatic control valve assembly is isolated from said pressure medium powered cylinder assembly.

2. An actuation system according to claim 1 further comprising switching means for switching said auxiliary actuating valve assembly into said pressure medium feed position and into said pressure medium discharge position independently of said pilot automatic control unit, said actual value, and said control input.

3. An actuation system according to claim 2 wherein said switching means can be switched manually.

4. An actuation system according to claim 3 wherein said switching means can be switched in response to operation of a clutch pedal.

5. An actuation system according to claim 1 wherein said auxiliary actuating valve assembly is separate from said pilot/automatic control valve assembly.

6. An actuation system according to claim 1 further comprising an automatic position control circuit which monitors said actual value and determines whether said actual value has been adjusted to said control input within a predetermined adjusting time, and, as a function of said determination, performs at least one task selected from the group consisting of operating a vehicle information system, operating at least one valve of the actuation system, blocking normal clutch actuation, enabling normal clutch actuation, blocking emergency clutch actuation, and enabling emergency clutch actuation.

7. A actuation system according to claim 1 wherein, when said mode valve assembly is in said at least one isolating position, said auxiliary actuating valve assembly can be in one of said pressure medium feed position and said pressure medium discharge position, said pressure medium being discharged from said pressure medium powered cylinder assembly via said mode valve when said auxiliary valve assembly is in said pressure medium discharge position.

8. An actuation system according to claim 7 wherein said at least one isolating position comprises a first switch position, wherein said main pressure medium source can be connected to said pressure medium powered cylinder assembly, and a second switch position, wherein said auxiliary pressure medium source can be connected to said pressure medium powered cylinder assembly.

9. An actuation system according to claim 1 wherein said auxiliary pressure medium source comprises an auxiliary pressure medium tank.

10. An actuation system according to claim 9 wherein, when said mode valve assembly is in said normal position, said main pressure medium source can be connected to said auxiliary pressure medium tank.

11. An actuation system according to claim 9 wherein said auxiliary actuating valve assembly comprises a switching valve assembly which can isolate said auxiliary pressure medium tank from said pressure medium powered cylinder, said main pressure medium tank, and said pilot/automatic control valve assembly.

12. An actuation system for a friction clutch installed in the drive train of a motor vehicle, said actuation system comprising
    a pressure medium powered cylinder assembly for actuating the friction clutch,
    means for providing a control input representing a desired actuation state of said clutch,
    means for providing an actual value representing the actual actuation state of said clutch,
    a main pressure medium source,
    a pilot/automatic control valve assembly which supplies pressure medium to said pressure medium powered cylinder assembly from said main pressure medium source as a function of said control input and said actual value, a pilot/automatic control unit which operates said pilot/automatic control valve assembly, an auxiliary pressure medium source comprising an auxiliary pressure medium tank, and a switching valve assembly which is switchable between a position wherein said tank is connected to said main pressure medium source, whereby said tank can be filled with pressure medium, a position wherein said tank is connected to said pressure medium powered cylinder, whereby said clutch can be actuated, and a position wherein said tank is isolated from said main pressure medium source and said pressure medium powered cylinder assembly, whereby said pressure medium is available in said tank for emergency use.

13. An said switching valve assembly according to claim 12 further comprising a nonreturn valve between said main pressure medium source and said auxiliary pressure medium tank, said nonreturn valve allowing the flow of pressure medium from said main pressure medium to said tank when the pressure of said medium at said source exceeds the pressure at said tank.

14. An actuation system according to claim 12 wherein, when said switching valve is in said position wherein said tank is isolated from said main pressure medium source and said pressure medium powered cylinder assembly, said pressure medium powered cylinder assembly can be connected to one of a pressure compensation port and a pressure compensation tank.

15. An actuation system according to claim 12 comprising an auxiliary actuating valve assembly for actuating said clutch independently of said pilot/automatic control valve assembly, said pilot/automatic control unit, and an instantaneous pressure medium pressure of said main pressure medium source, wherein said auxiliary actuating valve assembly can be switched into a pressure medium feed position, wherein said pressure medium powered cylinder assembly can be connected to one of said main pressure medium source and said auxiliary pressure medium source, and into a pressure medium discharge position, wherein said pressure medium powered cylinder assembly can be connected to one of a pressure compensation port and a pressure compensation tank, said auxiliary switching valve assembly comprising said switching valve assembly.

16. An actuation system according to claim 12 further comprising a throttle which, when said switching valve is in said position wherein said tank is connected to said pressure medium powered cylinder, limits the time for actuating said clutch.

17. An actuation system for a friction clutch installed in the drive train of a motor vehicle, said actuation system comprising a pressure medium powered cylinder assembly for actuating the friction clutch, means for providing a control input representing a desired actuation state of said clutch, means for providing an actual value representing the actual actuation state of said clutch, a main pressure medium source, a pilot/automatic control valve assembly which supplies pressure medium to said pressure medium powered cylinder assembly from said main pressure medium source as a function of said control input and said actual value, a pilot/automatic control unit which operates said pilot/automatic control valve assembly, an auxiliary pressure medium source comprising an auxiliary pressure medium tank, an auxiliary actuating valve assembly for actuating said clutch independently of said pilot/automatic control valve assembly, said pilot/automatic control unit, and an instantaneous pressure medium pressure of said main pressure medium source, wherein said auxiliary actuating valve assembly can be switched into a pressure medium feed position, wherein said pressure medium powered cylinder assembly can be connected to one of said main pressure medium source and said auxiliary pressure medium source, and into a pressure medium discharge position, wherein said pressure medium powered cylinder assembly can be connected to one of a pressure compensation port and a pressure compensation tank, and a control/diagnosis unit which detects information comprising the pressure of the pressure medium from the main pressure medium source, the pressure of the pressure medium from auxiliary pressure medium tank, the operability of the pilot/automatic control valve assembly, and the operability of the pilot/automatic control unit, and, as a function of said information, performs at least one task selected from the group consisting of operating a vehicle information system, operating at least one valve of the actuation system, blocking normal clutch actuation, enabling normal clutch actuation, blocking emergency clutch actuation, enabling emergency clutch actuation, and initiating filling of the auxiliary pressure medium tank.

18. An actuation system according to claim 17 further comprising switching means for switching said auxiliary actuating valve assembly into said pressure medium feed position and into said pressure medium discharge position independently of said pilot automatic control unit, said actual value, and said control input.

19. An actuation system according to claim 18 wherein said switching means can be switched manually.

20. An actuation system according to claim 19 wherein said switching means can be switched in response to operation of a clutch pedal.

21. An actuation system according to claim 17 wherein said auxiliary actuating valve assembly is separate from said pilot/automatic control valve assembly.

22. An actuation system according to claim 17 wherein said auxiliary actuating valve assembly comprises a mode valve assembly which can be switched between a normal position, wherein said pilot/automatic control valve assembly is in pressure medium flow connection with said pressure medium powered cylinder assembly, and at least one isolating position, wherein said pilot/automatic control valve assembly is isolated from said pressure medium powered cylinder assembly.

23. A actuation system according to claim 22 wherein, when said mode valve assembly is in said at least one isolating position, said auxiliary actuating valve assembly can be in one of said pressure medium feed position and said pressure medium discharge position, said pressure medium being discharged from said pressure medium powered cylinder assembly via said mode valve when said auxiliary valve assembly is in said pressure medium discharge position.

24. An actuation system according to claim 23 wherein said at least one isolating position comprises a first switch position, wherein said main pressure medium source can be connected to said pressure medium powered cylinder assembly, and a second switch position, wherein said auxiliary pressure medium source can be connected to said pressure medium powered cylinder assembly.

25. An actuation system according to claim 22 wherein, when said mode valve assembly is in said normal position, said main pressure medium source can be connected to said auxiliary pressure medium tank.

26. An actuation system according to claim 17 wherein said auxiliary actuating valve assembly comprises a switching valve assembly which can isolate said auxiliary pressure medium tank from said pressure medium powered cylinder, said main pressure medium tank, and said pilot/automatic control valve assembly.

27. An actuation system according to claim 17 further comprising an automatic position control circuit which monitors said actual value and determines whether said actual value has been adjusted to said control input within a predetermined adjusting time, and, as a function of said determination, performs at least one task selected from the group consisting of operating a vehicle information system, operating at least one valve of the actuation system, blocking normal clutch actuation, enabling normal clutch actuation, blocking emergency clutch actuation, and enabling emergency clutch actuation.

28. An actuation system according to claim 17 further comprising a shutoff valve assembly which is switchable between an open position, wherein the pilot/automatic control valve assembly is connected to said pressure medium powered cylinder assembly and said auxiliary actuating valve assembly, and a blocking position, wherein the pilot/automatic control valve assembly is isolated from said pressure medium powered cylinder assembly and said auxiliary actuating valve assembly, said blocking of normal clutch actuation comprising switching said shutoff valve assembly to said blocking position.

29. An actuation system according to claim 28 wherein said enabling of normal clutch actuation comprises switching said shutoff valve assembly to said open position.

30. An actuation system according to claim 28 wherein said control/diagnosis unit determines when at least one predetermined error criterion is satisfied based on said information, and said auxiliary actuating valve assembly and said shutoff valve assembly are connected so that normal clutch actuation is blocked and emergency clutch actuation is enabled when at least one predetermined error criterion is satisfied.

31. An actuation system according to claim 17 wherein said enabling of emergency clutch actuation comprises releasing said auxiliary actuating valve assembly so that the auxiliary actuating valve assembly can be switched into either one of the pressure medium feed position and the pressure medium discharge position.

32. An actuation system according to claim 17 wherein said blocking of emergency clutch actuation comprises switching said auxiliary actuating valve assembly to a neutral position wherein no pressure medium is fed to the pressure medium powered cylinder assembly and no pressure medium is discharged from the pressure medium powered cylinder assembly.

33. An actuation system for a friction clutch installed in the drive train of a motor vehicle, said actuation system comprising a pressure medium powered cylinder assembly for actuating the friction clutch, means for providing a control input representing a desired actuation state of said clutch, means for providing an actual value representing the actual actuation state of said clutch, a main pressure medium source, a pilot/automatic control valve assembly which supplies pressure medium to said pressure medium powered cylinder assembly from said main pressure medium source as a function of said control input and said actual value, a pilot/automatic control unit which operates said pilot/automatic control valve assembly, an auxiliary pressure medium source, an auxiliary actuating valve assembly for actuating said clutch independently of said pilot/automatic control valve assembly, said pilot/automatic control unit, and an instantaneous pressure medium pressure of said main pressure medium source, wherein said auxiliary actuating valve assembly can be switched into a pressure medium feed position, wherein said pressure medium powered cylinder assembly can be connected to one of said main pressure medium source and said auxiliary pressure medium source, and into a pressure medium discharge position, wherein said pressure medium powered cylinder assembly can be connected to one of a pressure compensation port and a pressure compensation tank, and an automatic position control circuit which monitors said actual value and determines whether said actual value has been adjusted to said control input within a predetermined adjusting time, and, as a function of said determination, performs at least one task selected from the group consisting of operating a vehicle information system, operating at least one valve of the actuation system, blocking normal clutch actuation, enabling normal clutch actuation, blocking emergency clutch actuation, and enabling emergency clutch actuation.

34. An actuation system according to claim 33 further comprising switching means for switching said auxiliary actuating valve assembly into said pressure medium feed position and into said pressure medium discharge position independently of said pilot automatic control unit, said actual value, and said control input.

35. An actuation system according to claim 34 wherein said switching means can be switched manually.

36. An actuation system according to claim 35 wherein said switching means can be switched in response to operation of a clutch pedal.

37. An actuation system according to claim 33 wherein said auxiliary actuating valve assembly is separate from said pilot/automatic control valve assembly.

* * * * *